(12) United States Patent
Tessier et al.

(10) Patent No.: US 11,459,091 B2
(45) Date of Patent: Oct. 4, 2022

(54) SYSTEM AND METHOD FOR CONTROLLING AIRCRAFT FLIGHT CONTROL SURFACES

(71) Applicant: BOMBARDIER INC., Dorval (CA)

(72) Inventors: Claude Tessier, Sainte-Adele (CA); Kurt Sermeus, Verdun (CA)

(73) Assignee: BOMBARDIER INC., Dorval (CA)

( * ) Notice: Subject to any disclaimer, the term of this patent is extended or adjusted under 35 U.S.C. 154(b) by 445 days.

(21) Appl. No.: 16/722,101

(22) Filed: Dec. 20, 2019

(65) Prior Publication Data

US 2020/0255124 A1    Aug. 13, 2020

Related U.S. Application Data

(60) Provisional application No. 62/782,534, filed on Dec. 20, 2018.

(51) Int. Cl.
*B64C 13/24* (2006.01)
*B64C 3/44* (2006.01)
*B64C 3/58* (2006.01)
*B64C 9/00* (2006.01)

(52) U.S. Cl.
CPC .............. *B64C 13/24* (2013.01); *B64C 3/44* (2013.01); *B64C 3/58* (2013.01); *B64C 9/00* (2013.01)

(58) Field of Classification Search
CPC .. B64C 13/24; B64C 3/44; B64C 3/58; B64C 9/00; B64C 2009/143
See application file for complete search history.

(56) References Cited

U.S. PATENT DOCUMENTS

| | | | |
|---|---|---|---|
| 5,082,207 A | 1/1992 | Tulinius | |
| 6,554,229 B1 * | 4/2003 | Lam | B64C 9/06 244/217 |
| 7,338,018 B2 | 3/2008 | Huynh et al. | |
| 7,611,099 B2 | 11/2009 | Kordel et al. | |
| 8,651,428 B2 | 2/2014 | Parker | |
| 9,038,964 B2 | 5/2015 | Wildman | |
| 9,688,384 B1 * | 6/2017 | Balzer | B64C 9/02 |
| 2012/0292452 A1 * | 11/2012 | Parker | B64C 9/16 244/203 |
| 2016/0031546 A1 | 2/2016 | Rolston | |
| 2017/0190413 A1 | 7/2017 | Hansen et al. | |
| 2018/0099736 A1 | 4/2018 | Kordel et al. | |
| 2019/0176962 A1 * | 6/2019 | Kordel | B64C 9/323 |
| 2019/0359314 A1 * | 11/2019 | Tsai | B64C 3/50 |

FOREIGN PATENT DOCUMENTS

GB        560996      *    5/1944

* cited by examiner

*Primary Examiner* — Rodney A Bonnette
(74) *Attorney, Agent, or Firm* — Norton Rose Fulbright Canada LLP (57) ABSTRACT

Methods, systems, and assemblies for controlling flight control surfaces of an aircraft wing are described. The method comprises displacing a first trailing edge of a first flight control surface towards a contact surface of a second flight control surface; determining a mechanical stiffness of the first flight control surface as defined by a ratio of $\Delta F/\Delta X$ as the first flight control surface is displaced, where $\Delta F$ is a difference in force F applied to at least two different positions X1 and X2 of the first flight control surface at times T1 and T2, and $\Delta X$ is a difference in position X2−X1; and achieving full contact between the first trailing edge and the second leading edge when a known full contact mechanical stiffness is reached.

21 Claims, 8 Drawing Sheets

SYSTEM AND METHOD FOR CONTROLLING AIRCRAFT FLIGHT CONTROL SURFACES

CROSS-REFERENCE TO RELATED APPLICATIONS

The present application claims the benefit of U.S. Provisional Patent Application No. 62/782,534 filed on Dec. 20, 2018, the contents of which are hereby incorporated by reference.

TECHNICAL FIELD

The present disclosure relates generally to the control of aircraft flight control surfaces, and more particularly to control of aircraft flight control surfaces for variable camber wings.

BACKGROUND OF THE ART

Variable camber is a feature of some aircraft wings whereby the shape (or curvature) of the wing is changed during flight by moving the flaps and possibly the ailerons. The flaps may be moved over a range of positions. Adapting the shape of the wing inflight reduces drag and helps control lift distribution for load alleviation, with savings on fuel burn and weight.

In order to maintain aerodynamic smoothness requirements during cruise flight, the spoilers of an aircraft wing need to be properly sealed against the flap such that the spoiler trailing edge remains in full contact with the flap surface, leaving no opening and as little surface discontinuity as possible. On a conventional wing where flaps do not move in cruise flight, the seal between the flap and the spoiler is achieved by position control of the spoiler to a "zero position", combined with a preload set by on-ground rigging. For a variable camber wing, the seal is maintained by controlling the spoiler to follow the flap position as the flap moves over a certain range of positions.

It is very difficult to determine spoiler position accurately enough to ensure proper sealing and avoid large loads on the flap. In some instances, spoilers are specially designed to provide more tolerance for spoiler position measurement, the trade-off being aerodynamic performance.

Therefore, improvements are needed.

SUMMARY

In accordance with a broad aspect, there is provided a method for controlling flight control surfaces of an aircraft wing having a first flight control surface and a second flight control surface, the first flight control surface having a first leading edge and a first trailing edge, the second flight control surface having a contact surface extending between a second leading edge and a second trailing edge, the first flight control surface movable to contact the first trailing edge with the contact surface and make a seal therewith. The method comprises displacing the first trailing edge of the first flight control surface towards the contact surface of the second flight control surface; determining a mechanical stiffness of the first flight control surface as defined by a ratio of $\Delta F/\Delta X$ as the first flight control surface is displaced, where $\Delta F$ is a difference in force F applied to at least two different positions X1 and X2 of the first flight control surface at times T1 and T2, and $\Delta X$ is a difference in position X2−X1; and achieving full contact between the first trailing edge and the second leading edge when a known full contact mechanical stiffness is reached.

In some embodiments, displacing the first trailing edge of the first flight control surface comprises rotating the first flight control surface about an axis using an actuator.

In some embodiments, the force F applied to the first flight control surface is measured as a pressure variation across the actuator as $\Delta P*A$, and $\Delta F$ is $\Delta (\Delta P)*A$, where A is an operational area of the actuator.

In some embodiments, the positions X1 and X2 of the first flight control surface are measured as angular positions of the first flight control surface.

In some embodiments, the method further comprises displacing, once full contact has been achieved, the first trailing edge of the first flight control surface away from the contact surface of the second flight control surface until a known intermediate mechanical stiffness is reached, the intermediate mechanical stiffness being smaller than the full contact mechanical stiffness.

In some embodiments, the intermediate mechanical stiffness corresponds to a bow stiffness plus a delta value.

In some embodiments, the method further comprises displacing, once full contact has been achieved, the first trailing edge of the first flight control surface away from the contact surface of the second flight control surface until a known aerodynamic mechanical stiffness is reached, the aerodynamic mechanical stiffness being smaller than the full contact mechanical stiffness; and repeating displacing of the first trailing edge of the first flight control surface towards the contact surface of the second flight control surface until the full contact mechanical stiffness is reached.

In some embodiments, the method further comprises repeating displacing of the first trailing edge of the first flight control surface away from the contact surface of the second flight control surface when a predetermined condition has been met.

In some embodiments, the predetermined condition corresponds to one or more of a change in weight of the aircraft beyond a weight threshold, a percentage of total fuel burnt, a change in aircraft speed beyond a speed threshold, an elapsed time, and a change in aircraft altitude beyond an altitude threshold.

In some embodiments, the first flight control surface is a spoiler and the second flight control surface is a flap.

In accordance with another broad aspect, there is provided a system for controlling flight control surfaces of an aircraft wing having a first flight control surface and a second flight control surface, the first flight control surface having a first leading edge and a first trailing edge, the second flight control surface having a contact surface extending between a second leading edge and a second trailing edge, the first flight control surface movable to contact the first trailing edge with the contact surface and make a seal therewith. The system comprises a processor and a non-transitory storage medium coupled to the processor and having stored thereon program instructions. The program instructions are executable by the processor for displacing the first trailing edge of the first flight control surface towards the contact surface of the second flight control surface; determining a mechanical stiffness of the first flight control surface as defined by a ratio of $\Delta F/\Delta X$ as the first flight control surface is displaced, where $\Delta F$ is a difference in force F applied to at least two different positions X1 and X2 of the first flight control surface at times T1 and T2, and $\Delta X$ is a difference in position X2−X1; and achieving full contact between the first trailing edge and the second leading edge when a known full contact mechanical stiffness is reached.

In some embodiments, displacing the first trailing edge of the first flight control surface comprises rotating the first flight control surface about an axis using an actuator.

In some embodiments, the force F applied to the first flight control surface is measured as a pressure variation across the actuator as $\Delta P^*A$, and $\Delta F$ is $\Delta (\Delta P)^*A$, where A is an operational area of the actuator.

In some embodiments, the positions X1 and X2 of the first flight control surface are measured as angular positions of the first flight control surface In some embodiments, the program instructions are further executable for displacing, once full contact has been achieved, the first trailing edge of the first flight control surface away from the contact surface of the second flight control surface until a known intermediate mechanical stiffness is reached, the intermediate mechanical stiffness being smaller than the full contact mechanical stiffness.

In some embodiments, the intermediate mechanical stiffness corresponds to a bow stiffness plus a delta value.

In some embodiments, the program instructions are further executable for displacing, once full contact has been achieved, the first trailing edge of the first flight control surface away from the contact surface of the second flight control surface until a known aerodynamic mechanical stiffness is reached, the aerodynamic mechanical stiffness being smaller than the full contact mechanical stiffness; and repeating displacing of the first trailing edge of the first flight control surface towards the contact surface of the second flight control surface until the full contact mechanical stiffness is reached.

In some embodiments, the program instructions are further executable for repeating displacing of the first trailing edge of the first flight control surface away from the contact surface of the second flight control surface when a predetermined condition has been met.

In some embodiments, the predetermined condition corresponds to one or more of a change in weight of the aircraft beyond a weight threshold, a percentage of total fuel burnt, a change in aircraft speed beyond a speed threshold, an elapsed time, and a change in aircraft altitude beyond an altitude threshold.

In some embodiments, the first flight control surface is a spoiler and the second flight control surface is a flap.

In accordance with yet another broad aspect, there is provided a flight control surface assembly comprising a first flight control surface having a first leading edge and a first trailing edge; a second flight control surface having a contact surface extending between a second leading edge and a second trailing edge; an actuator coupled to the first flight control surface and configured for displacing the first trailing edge of the first flight control surface towards the contact surface of the second flight control surface; and a controller coupled to the actuator and configured for determining a mechanical stiffness of the first flight control surface as defined by a ratio of $\Delta F/\Delta X$ as the first flight control surface is displaced, where $\Delta F$ is a difference in force F applied to at least two different positions X1 and X2 of the first flight control surface at times T1 and T2, and $\Delta X$ is a difference in position X2−X1 and communicating to the actuator that full contact between the contact surface and the first trailing edge is achieved when a known full contact mechanical stiffness is reached.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
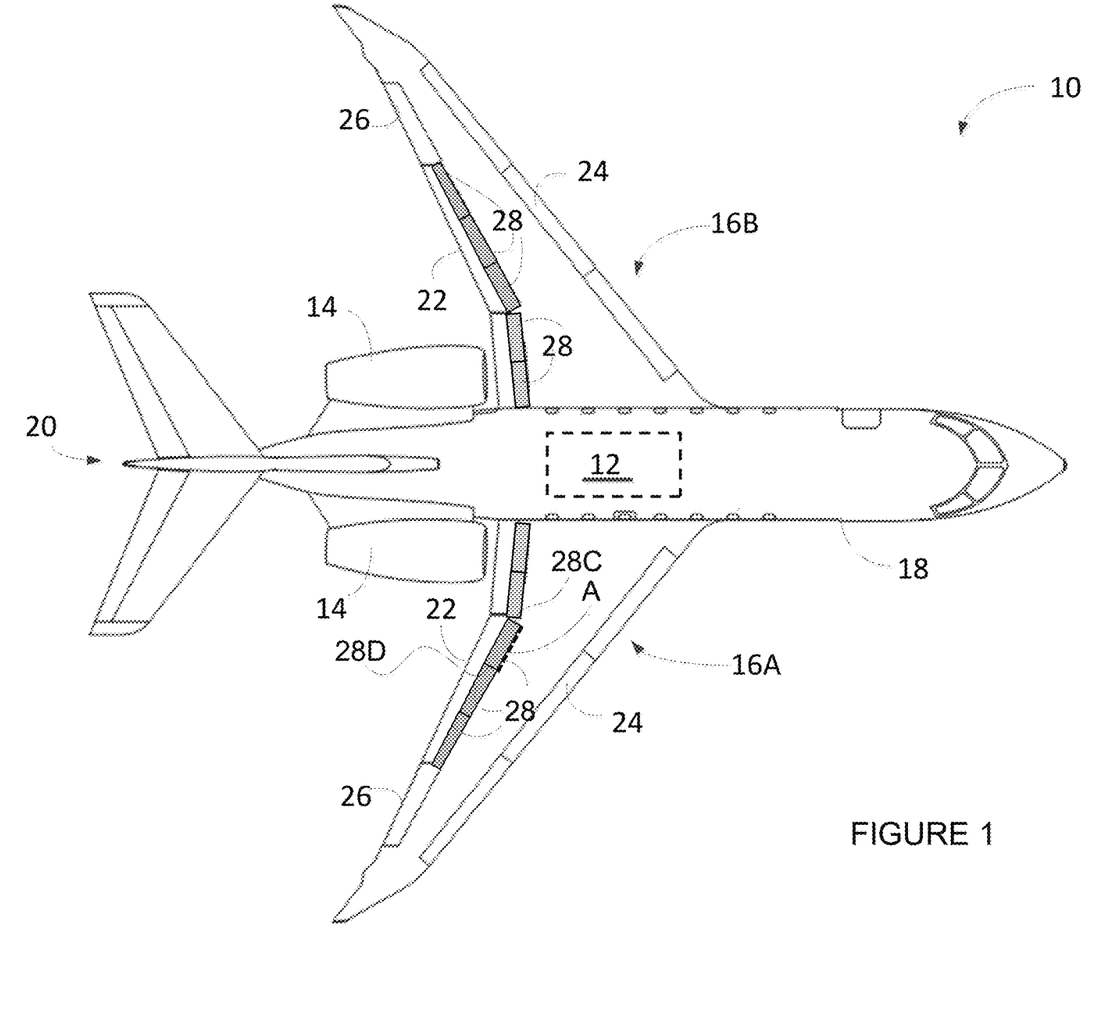
FIG. 1 is a top view of an aircraft, in accordance with an illustrative embodiment.

FIG. 1 is a top view of an exemplary aircraft 10. Aircraft 10 can be any type of aircraft such as corporate, private, military, commercial and passenger aircraft suitable for aviation. Aircraft 10 can be manned or unmanned (e.g., drone). For example, aircraft 10 can be a (e.g., ultra-long range) business jet or a narrow-body, twin-engine jet airliner. Aircraft 10 can be a fixed-wing aircraft comprising one or more engines 14. Alternatively, aircraft 10 can be a glider with no engines. Aircraft 10 can comprise wings 16A, 16B (referred generally herein as "wings 16"), fuselage 18 and empennage 20. One or more of engines 14 can be mounted to fuselage 18. Alternatively, or in addition, one or more of engines 14 can be mounted to wings 16. Aircraft 10 can comprise a passenger cabin and a cockpit inside fuselage 18. On the aircraft depicted in FIG. 1, and in relation to a forward-facing direction, wing 16A is a right-hand (e.g., starboard) side wing and wing 16B is a left-hand (e.g., port) side wing.

Aircraft 10 can include any known or other suitable flight control surfaces configured to interact with air flowing around aircraft 10 during flight. A controller 12 (shown schematically) can be operatively coupled to such flight control surfaces for control thereof. Such flight control surfaces can include trailing edge flaps 22 and leading edge slats 24 which may be used as "high-lift" surfaces that may be deployed to increase the amount of lift generated by wings 16 to which trailing edge flaps 22 and leading edge slats 24 are mounted. For example, such high-lift flight control surfaces may be deployed during landing, take-off and/or during any other appropriate phases of flight or conditions requiring increased lift. If aircraft 10 includes variable camber functionality such that trailing edge flaps 22 can provide negative camber, trailing edge flaps 22 can also provide decreased lift during some phases of flight. If aircraft 10 includes variable camber functionality such that trailing edge flaps 22 can provide positive camber, trailing edge flaps 22 can also provide increased lift during some phases of flight.

Aircraft 10 can also include one or more ailerons 26 movably mounted to each wing 16. Ailerons 26 can be considered primary flight control surfaces that cause aircraft 10 to move (i.e., rotate) about a longitudinal axis during flight. In other words, movement of ailerons 16 in flight can cause aircraft 16 to roll. Ailerons 26 can be located on the outboard trailing edge of each wing 16.

Still referring to FIG. 1, the aircraft 10 further includes spoilers 28 located on an inboard side of the wing relative to the ailerons 26. The spoilers 28 can be considered as control surfaces. In a particular embodiment, the spoilers 28 are used as "aerodynamic brakes" for slowing down the aircraft 10 when flying, for instance, when a speed of the aircraft 10 is too high prior to landing. The spoilers 28 may be used for braking the aircraft 10 after said aircraft 10 has touched a ground. Braking also occurs through reduced lift, which puts more weight on the wheels of the aircraft 10 and thus contributes to braking through wheel friction. The spoilers 28 may assist the ailerons 26 in controlling a roll motion of the aircraft 10.

Figure 2A:
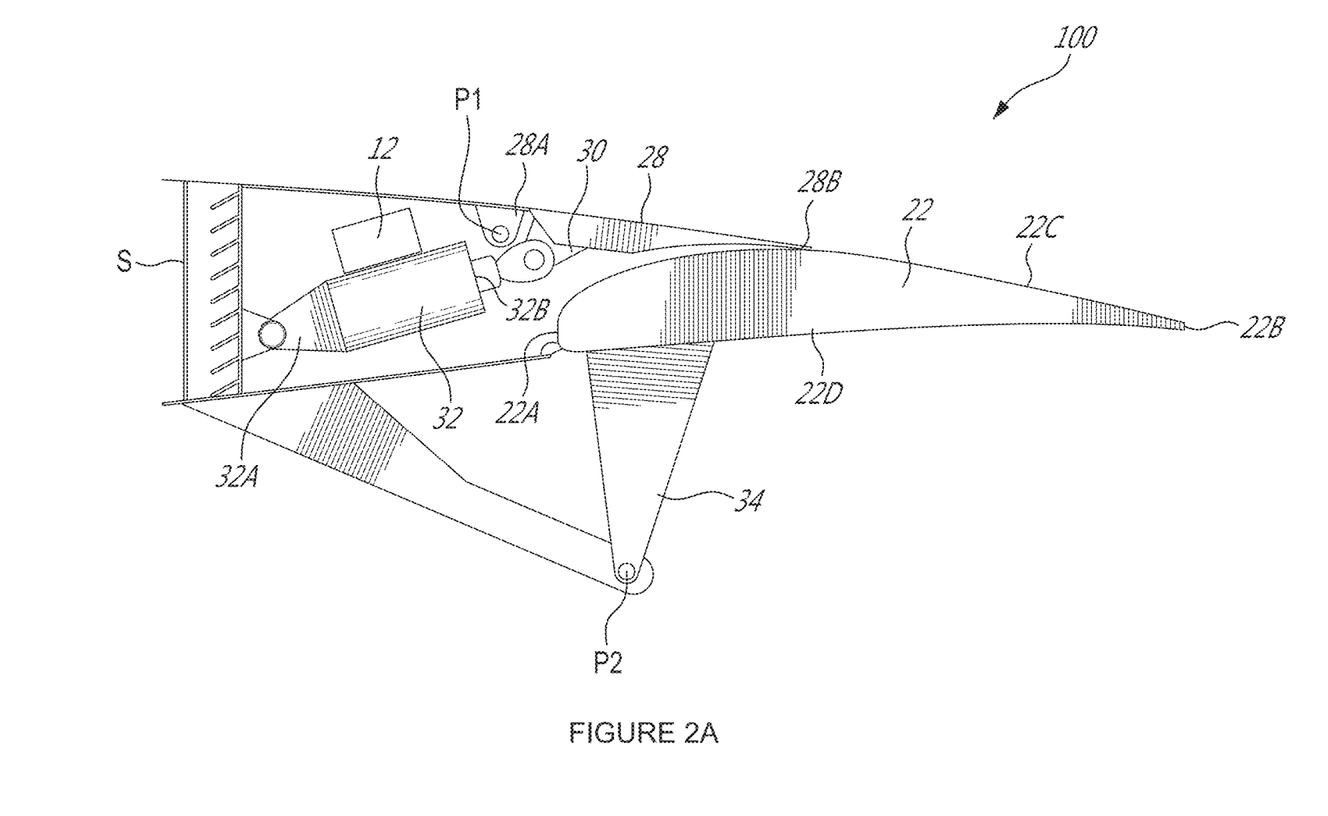
FIG. 2A is a cross-sectional view of a flight control surface assembly, in accordance with an illustrative embodiment.

Referring now to FIG. 2A, a flight control surface assembly is generally shown at 100. The assembly 100 includes at least one first flight control surface, hereinafter one of the spoilers 28, and at least one second flight control surface, hereinafter one of the flaps 22. As illustrated, the flap 22 has an aerodynamic profile having a leading edge 22a and a trailing edge 22b. A contact surface 22c extends between the trailing edge 22b and the leading edge 22a.

Herein, the expressions "leading edge" and "trailing edge" when referring to an aerodynamic profile should not be limited to an absolute end of the profile, but should be construed as encompassing a region of the aerodynamic profile proximate the absolute end. For instance, the trailing edge of an aerodynamic profile may encompass a region extending from the trailing edge toward the leading edge along a length corresponding to about 10% of a distance from the leading edge to the trailing edge, also known as chord length.

The trailing edge 22b of the flap 22 is usually exposed to a surrounding environment of the aircraft in all phases (e.g., take-off, cruise, landing) of a flight. The leading edge 22a of the flap 22 is usually only exposed to the surrounding environment during take-off and landing when the flaps 22 are deployed. In the depicted embodiment, during cruise, the leading edge 22a of the flap 22 is hidden from the surrounding environment by the spoiler 28. As shown, the spoiler 28 has a leading edge 28a and a trailing edge 28b. During cruise, the trailing edge 28b of the spoiler 28 is in abutment against the contact surface 22c of the flap 22 so as to create a seal therebetween.

The spoiler 28 is able to rotate about an axis A (FIG. 1) that may extend substantially parallel to its leading edge 28a. In the embodiment shown, the spoiler 28 is pivotally mounted to the wing 16a, 16b at a pivot point P1 located proximate the leading edge 28a. An arm 30 is secured to the spoiler 28, more specifically to its underside, and extends away therefrom. The assembly 100 further includes an actuator 32 having a first end 32a pivotally mounted to a structural member S of the wing 16a and a second end 32b pivotally mounted to the arm 30. The actuator 32 is operable to push and pull the arm 30 such as to induce rotation of the spoiler 28 about the pivot point P1. Any suitable actuator known in the art may be used, such as, for instance, an hydraulic actuator, a pneumatic actuator, an electromechanical actuator and an electric actuator. In addition, the actuator 32 may be mounted to structural member S and/or to the arm 30 using other connection techniques, such as flange mounted, kick link/reaction link, and the like.

Figure 2B:
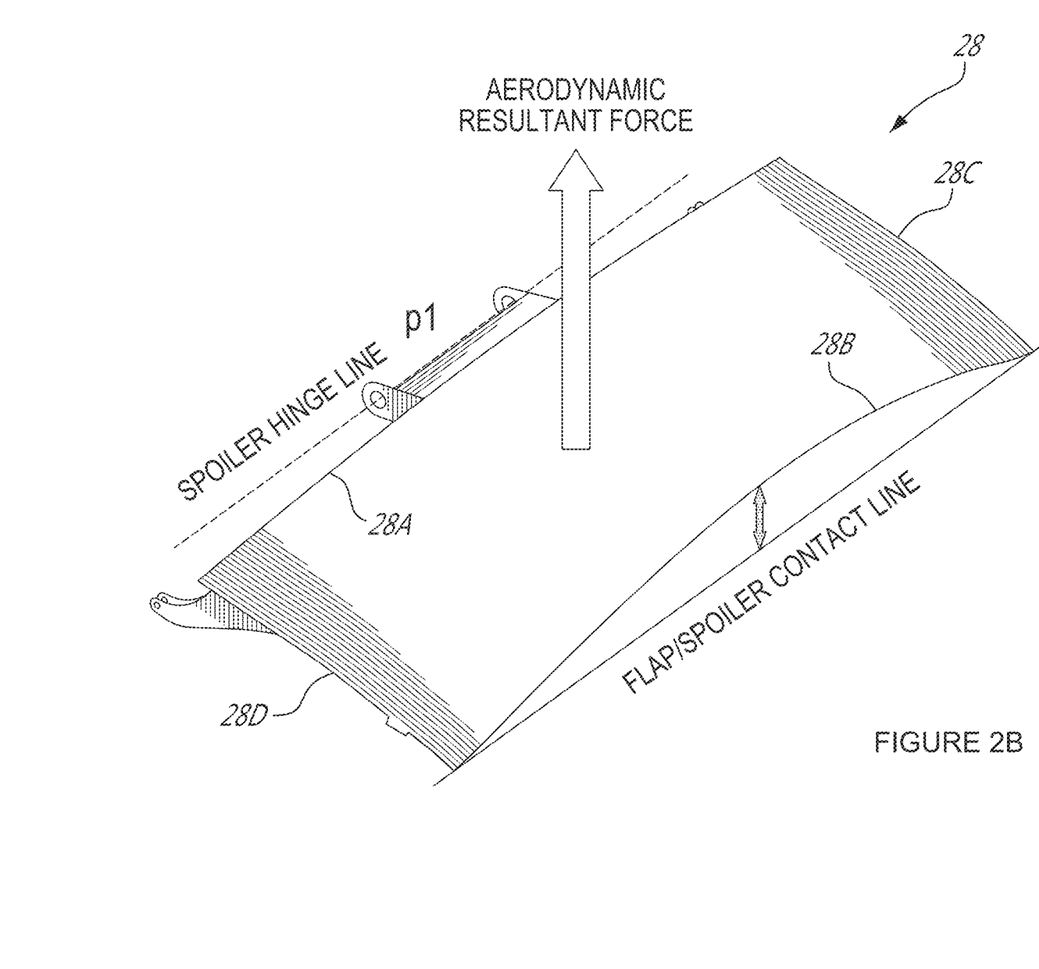
FIG. 2B is a schematic illustration of a spoiler with pre-bow, in accordance with an illustrative embodiment.

In some embodiments, the trailing edge 28b of the spoiler 28 may be manufactured to have a curve, or pre-bow, such that the corners of the spoiler 28 contact the flap 22 first. An example embodiment is illustrated in FIG. 2B, where the spoiler pre-bow is exaggerated for the sake of illustration. Without the pre-bow, the aerodynamic load on the spoiler 28 may cause the corners of the spoiler, which are located at an intersection between the trailing edge 28b of the spoiler 28 and its inboard and outboard sides 28c, 28d, to move away from the flap 22, and thereby create gaps between the spoiler 28 and the flap 22 at the corners. The pre-bow may alleviate this phenomenon.

In the embodiments shown in FIGS. 1 and 2A, the wings 16a, 16b of the aircraft 10 are variable-camber wings. Such wings are able to change their aerodynamic profile as a function of operating conditions to increase an aerodynamic performance of the aircraft 10. In the embodiment shown, the camber of either of the wings 16a, 16b is adjustable by movement of either of the flaps 22. The flaps 22 may rotate about a pivot point P2 located proximate the leading edge 22a. An arm 34 extends from an undersurface 22d of the flap 22 to pivot point P2.

The embodiment shown in FIG. 2A, with a so-called dropped-hinge mechanism, is just one example where the methods and systems described herein may be applied. For example, the methods and systems may also be applied with hooked-track mechanisms, link-track mechanisms, four-bar linkage mechanisms, combinations thereof, or any other flap mechanism. Any mechanism known in the art for moving the flaps 22 may be used without departing from the scope of the present disclosure. For instance, an actuator (not shown) may be coupled to the controller 12 of the aircraft 10 for controlling the position of the flaps 22. The controller 12 may be configured to dynamically change the position of the flaps 22 to optimize the aerodynamic performance of the aircraft 10 when flying.

Moving one of the flaps 22 from a first position to a second position may create a gap between the flap 22 and an associated one of the spoilers 28. As the aircraft 10 may be flying at transonic speeds in cruise operating conditions, any imperfections in a smoothness of an external surface of the wings 16 of the aircraft 10 may result in a decrease in lift, an increase in drag, and/or in an increase in fuel consumption. Consequently, the controller 12 is configured to close, or seal, the gap between the spoiler 28 and the flap 22.

The controller 12 is operatively connected to the actuator 32 for controlling a movement of the actuator 32 and of the spoiler 28 connected thereto. Generally, the controller 12 is configured for controlling flight control surfaces of the wings 16a, 16b. More specifically, the controller 12 controls the actuator 32 to displace the trailing edge 28b of the spoiler 28 toward the contact surface 22c of the flap 22.

As the spoiler 28 is displaced towards the flap 22, or after each iteration of displacement, the controller 12 is configured for determining a mechanical stiffness of the spoiler 28. The mechanical stiffness of the spoiler 28 is defined by a ratio of $\Delta F/\Delta X$ as the spoiler 28 is displaced. Herein, $\Delta F$ is a difference in force F applied to the spoiler 28 and $\Delta X$ is a difference in position X of the spoiler 28. More specifically, $\Delta F$ is the difference in force F2−F1 (or F1−F2) between two positions X1 and X2 achieved at times T1<T2 such that $\Delta X$=X2−X1 (or X1−X2). F is the force exerted by the actuator 32.

There are many ways in which $\Delta F$ can be measured. For example, in the case of a hydraulic actuator, force F may be measured as $\Delta P*A$, where $\Delta P$ is the differential pressure across a piston of the actuator 32 and A is an operational area of the actuator 32. Therefore, ΔF is the variation of the force F over two different positions of the piston, and ΔF=Δ(ΔP)*A=(ΔPe−ΔPr)*A=F2−F1. Note that Pe is the pressure in the extent chamber of the cylinder of the piston and Pr is the pressure in the retract chamber of the cylinder of the piston. F=A*(Pe−Pr) for a same area on each side of the piston; F=Ae*Pe−Ar*Pr for different areas on each side of the piston, where Ae is the area in the extent chamber of the cylinder of the piston and Ar is the area in the retract chamber of the cylinder of the piston.

In the case of an electromechanical or electric actuator, the force F may be measured indirectly from the motor current. Furthermore, the force F may be measured using strain gauges, for any type of spoiler actuator. The force F may also be measured using other types of load cells.

In some embodiments, more than one measurement of F1, F2 and/or ΔF is used to improve accuracy, or to detect faults or failures and isolate them. A single measurement at one particular time, or a sequence of measurements over a given time interval may be used.

In some embodiments, F1, F2 and ΔF may be estimated from an algebraic estimator, such as an average or weighted-average, or a dynamic filter, such as a Kalman filter.

Some data filtering may be applied to estimated or measured values of F1, F2 and ΔF in order to pre-process the data.

There are many ways in which ΔX can be measured. For example, the positions X1, X2 of the spoiler 28 may be angular positions of the spoiler 28. The angular positions may be measured by a sensor operatively connected to the spoiler 28. The positions X1, X2 may be piston positions of a piston of the actuator 32. The piston positions may be measured with a sensor, such as a Linear Variable Differential Transformer (LVDT) transducer. Alternatively, the positions of the spoiler 28 may be directly measured with a resolver or a Rotation Variable Differential Transformer (RVDT) transducer at the pivot point P1 of the spoiler 28. Any other suitable method to measure the piston and/or spoiler positions known in the art may be used without departing from the scope of the present disclosure.

In some embodiments, X1, X2 and/or ΔX may be estimated from one or more measurements. In some embodiments, X1, X2 and/or ΔX may be estimated from one type of measurement (e.g. from LVDT transducer measurements) or a combination of types of measurements (e.g. from LVDT transducer measurements and RVDT transducer measurements).

In some embodiments, X1, X2 and/or ΔX may be estimated from an algebraic estimator, such as an average or weighted-average, or a dynamic filter, such as a Kalman filter.

In some embodiments, data filtering is applied to estimated or measured values of X1, X2 and ΔX to pre-process the data.

Figure 3:
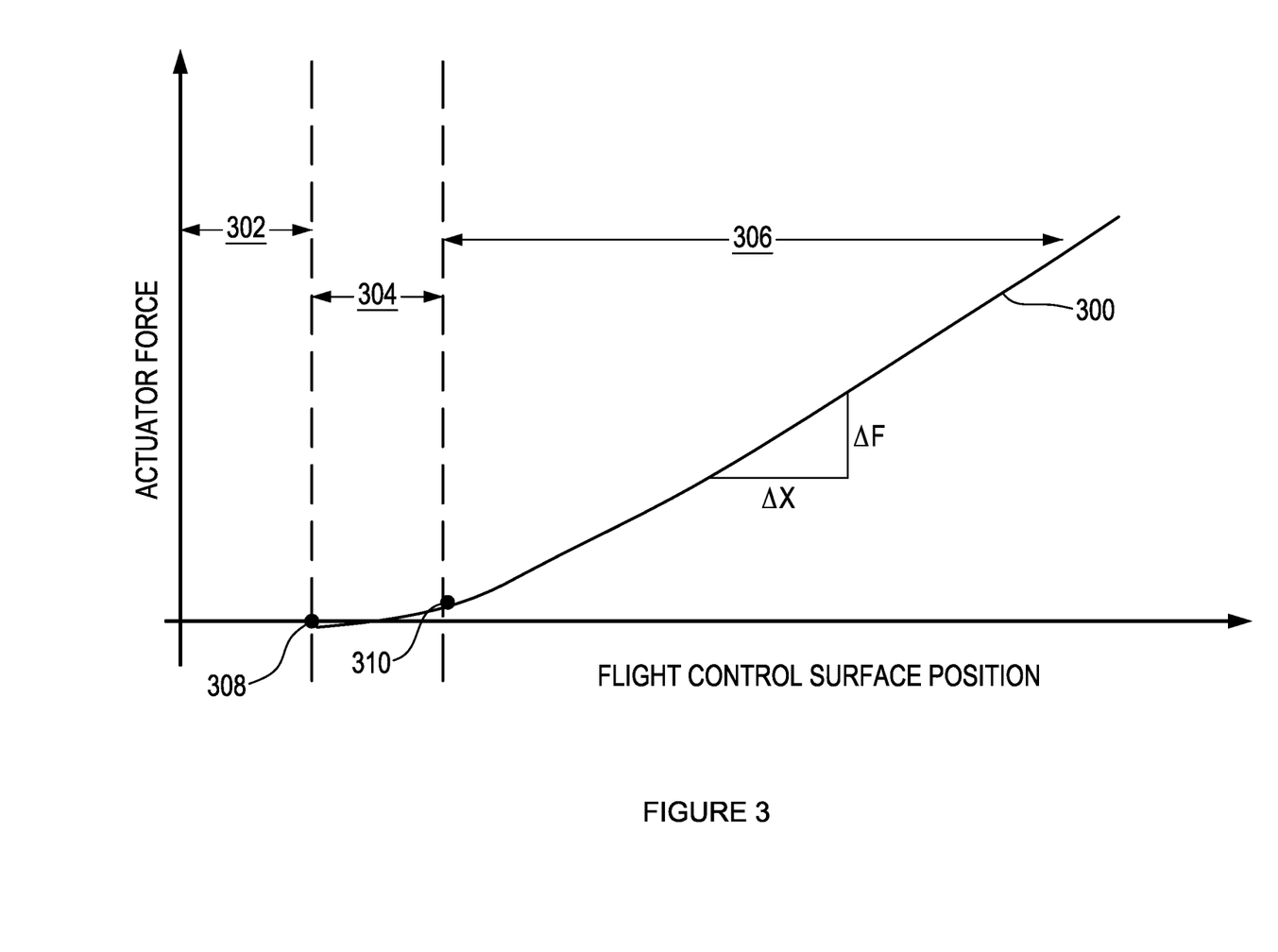
FIG. 3 is a graph illustrating a variation between a flight control surface position and a force applied to the flight control surface, in accordance with an illustrative embodiment.

The stiffness of the spoiler 28 may fall into three distinct ranges of values, which are illustrated in FIG. 3 in accordance with an illustrative embodiment. FIG. 3 is a curve 300 showing the contact force between the spoiler 28 and the flap 22. The position of the spoiler 28 is shown on the x-axis and the actuator force is shown on the y-axis. As illustrated, increasing X corresponds to the spoiler 28 moving towards to the contact surface 22c of the flap 22. The slope of the curve 300 corresponds to the change in force (ΔF) over the change in position (Δx), which is equivalent to stiffness (k):

$$k = \Delta F / \Delta x = (F2 - F1)/(X2 - X1)$$

As noted in the equations above, force (F) may be replaced with differential pressure (ΔP) across the actuator 32 multiplied by an operational area (A) of the actuator 32. Other variants of the equations used to represent force and displacement may also be used.

The values for stiffness (k) found in region 302 are referred to herein as an aerodynamic stiffness and correspond to a range of stiffness values obtained when there is no contact between the trailing edge 28b of the spoiler 28 and the contact surface 22c of the flap 22. The aerodynamic load, i.e. the air flowing around the aircraft, is substantially the only force exerted on the spoiler 28, apart from gravity which would essentially disappear when computing ΔF and therefore is neglected. As such, the stiffness values in the aerodynamic stiffness range 302 are very low.

The values for stiffness (k) found in region 304 are referred to herein as a bow stiffness, and correspond to a range of stiffness values obtained when an initial contact is made between the bowed corners of the spoiler 28 and the flap 22. The stiffness of the spoiler 28 increases as it moves from aerodynamic stiffness 302 to bow stiffness 304. The transition from aerodynamic stiffness 302 to bow stiffness 304 occurs at knee point 308 of the curve 300.

The values for stiffness (k) found in region 306 are referred to herein as full contact stiffness, also known as full contact mechanical stiffness, and correspond to a range of stiffness values obtained when full contact is reached between the trailing edge 28b of the spoiler 28 and the contact surface 22c of the flap 22. A seal is thus made along the entirety of the trailing edge 28b of the spoiler 28 with the contact surface 22c of the flap 22. The stiffness of the spoiler 28 continues to increase as it moves from bow stiffness 304 to full contact stiffness 306. The full contact stiffness values are thus higher than the aerodynamic stiffness values and higher than the bow stiffness values. The transition from bow stiffness 304 to full contact stiffness 306 occurs at the knee point 310 of the curve 300.

Note that it is possible that a portion or all of the pre-bow of the spoiler 28 disappears when the aircraft 10 is in flight because of the aerodynamic load the spoiler 28 is subjected to. In such instances, bow stiffness 304 may be reduced to a very narrow range, or completely removed, from the curve 300. The stiffness of the spoiler 28 would thus transition from aerodynamic stiffness 302 directly to full contact stiffness 306.

The controller 12 causes the trailing edge 28a of the spoiler 28 to move toward the contact surface 22c of the flap 22 and determines the mechanical stiffness of the spoiler as it is displaced toward the flap 22. A full contact between the spoiler 28 and the flap 22 is achieved when a known full contact mechanical stiffness is reached. This value may be known a priori as it is a function of the shape and material used for the spoiler 28. The mechanical stiffness values may be determined by ground testing and are substantially constant whether the aircraft 10 is inflight or on the ground. Any known methods of determining mechanical stiffness may be used.

Figure 4:
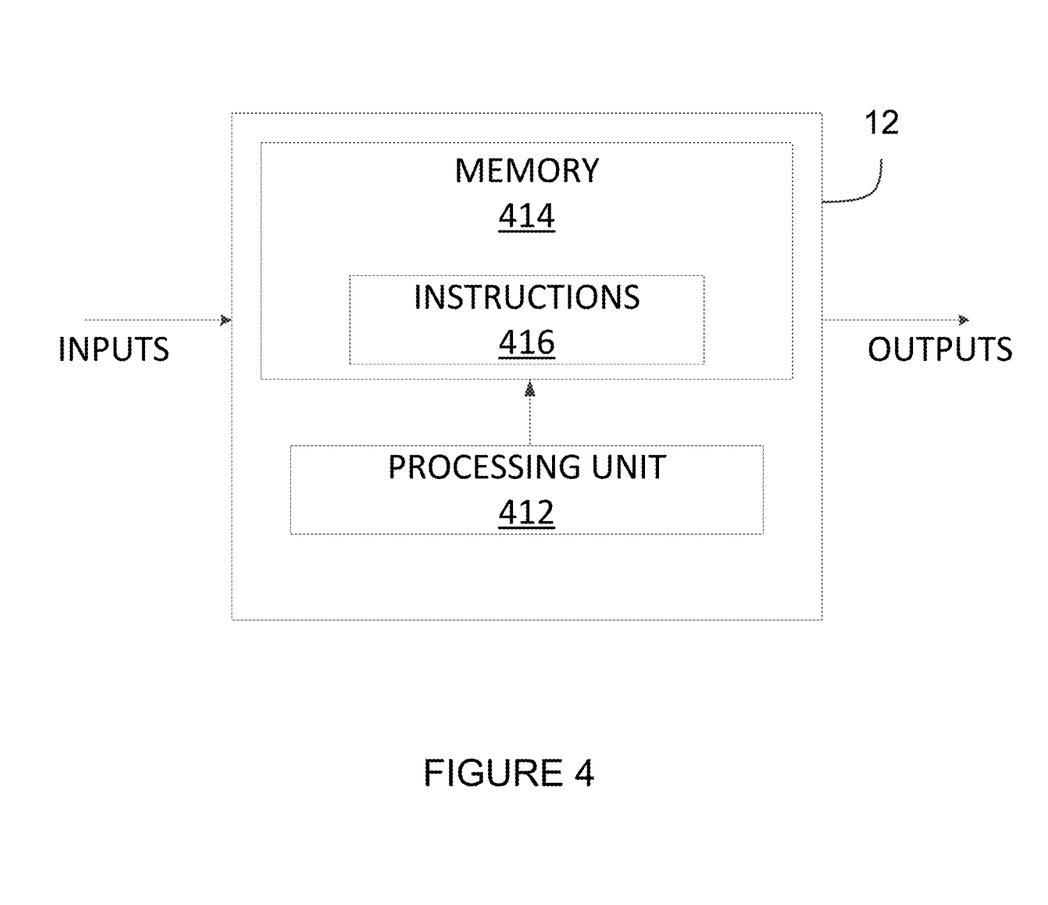
FIG. 4 is a block diagram of an example controller, in accordance with an illustrative embodiment.

With reference to FIG. 4, there is illustrated an example embodiment for the controller 12. A processing unit 412 and a memory 414 which has stored therein computer-executable instructions 416 are provided. The processing unit 412 may comprise any suitable device configured to implement the controller 12 such that instructions 416, when executed by the processing unit 412, may cause the functions/acts/steps as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to the controller 12, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means suitable for retrievably storing machine-readable instructions 416 executable by processing unit 412. In some embodiments, the controller 12 can be implemented as part of an aircraft computer.

Figure 5A:
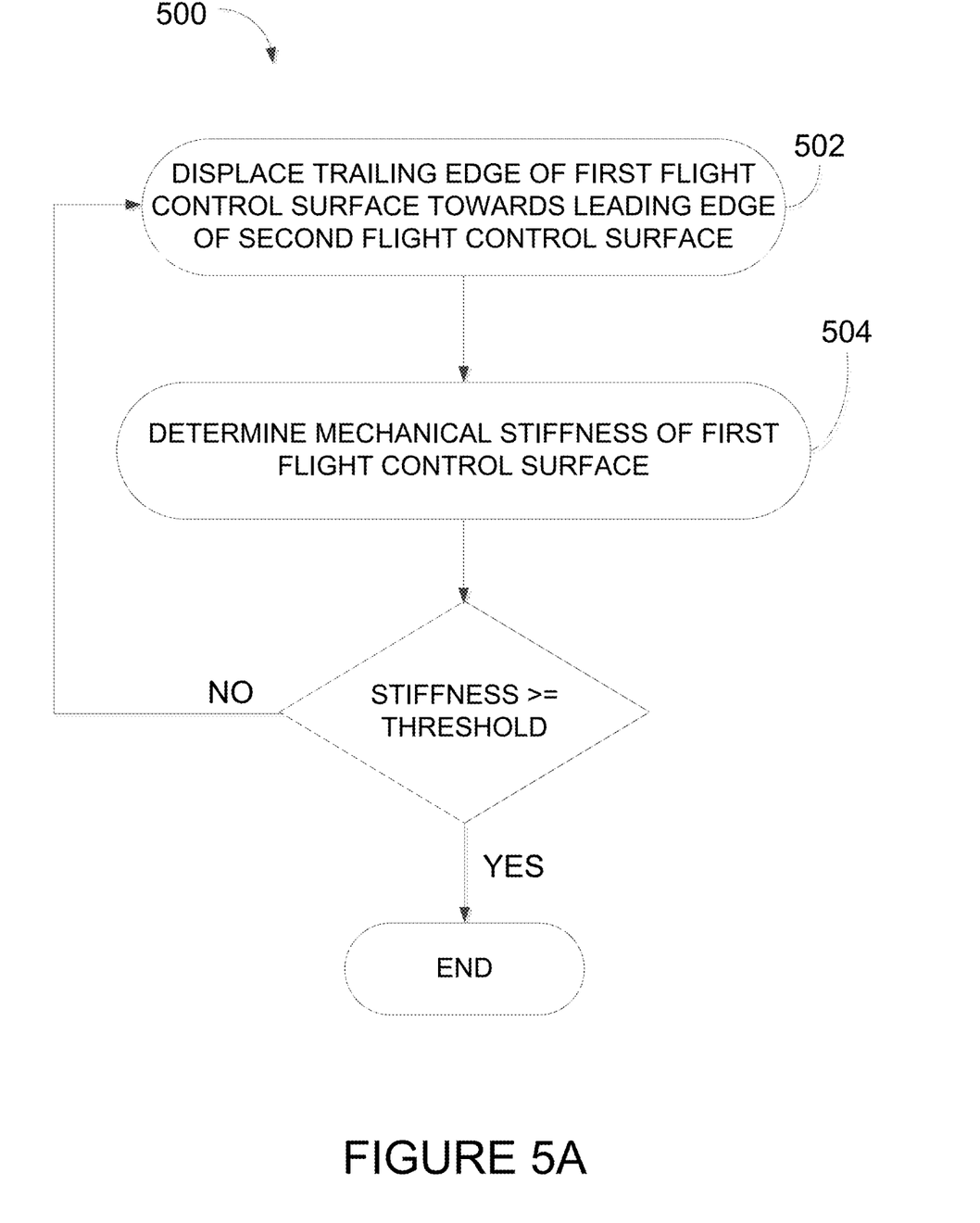
FIG. 5A is a flowchart of a method for controlling flight control surfaces, in accordance with an illustrative embodiment.

With reference to FIG. 5A, there is illustrated a first embodiment of a method 500 for controlling the flight control surfaces, such as spoilers 28, of aircraft wings 16a, 16b. At step 502, the trailing edge 28b of the first flight control surface, i.e. spoiler 28, is displaced, via the actuator 32, towards the contact surface 22c of the second flight control surface, i.e. the flap 22.

At step 504, the mechanical stiffness of the first flight control surface is determined, as defined by the ratio of $\Delta F/\Delta X$ as the first flight control surface is displaced, where $\Delta F$ is a difference in force F applied to the first flight control surface, and $\Delta X$ is a difference in position X of the first flight control surface. In some embodiments, steps 502 and 504 are performed iteratively until the stiffness reaches a threshold. The mechanical stiffness may be determined repeatedly, at a given sampling period.

Full contact is achieved between the first flight control surface and the second flight control surface when a threshold is reached. In some embodiments, the threshold corresponds to a known full contact mechanical stiffness, such as a point on curve 300 that falls in region 306. The known full contact mechanical stiffness may be selected at various positions along the curve 300 in region 306, such as at knee point 310 or at knee point 310 plus a delta value, to account for turbulence and air gusts. The delta value relative to the knee point 310 corresponds to a predefined variation in displacement DX, a predefined variation in force DF, or a combination thereof, and may be used to ensure that if lift momentarily increases on the spoiler 28, the spoiler 28 will be able to resist and remain in contact with the flap 22. In some embodiments, the method 500 is only stopped when some persistence has been achieved. Persistence refers to ensuring that the mechanical stiffness is maintained at or above a threshold for a sufficient duration.

In some embodiments, the position of the spoiler 28 is recorded when full contact is achieved. This may allow a return to the recorded position if full contact is momentarily interrupted due to another procedure, such as roll assist. Roll assist consists in deploying the spoilers 28 in addition to the ailerons 26 in large and rapid roll maneuvers.

In some embodiments, step 502 comprises having the spoiler 28 approach the flap 22 based on position control. It can be determined, based on kinematics of the structural elements of the wing 16 and the current positions of the control surfaces, that contact is about to occur. Spoiler motion rate may be modulated accordingly, to reduce the impact force at contact in the presence of uncertainty. In some embodiments, step 504 comprises determining the mechanical stiffness K only when it has been determined, at step 502, that contact is about to occur. In some embodiments, the mechanical stiffness K is determined periodically, with a sample period small enough to control the contact force with a desired performance. For example, the sampling rate may be the same as that used for position control.

Figure 5B:
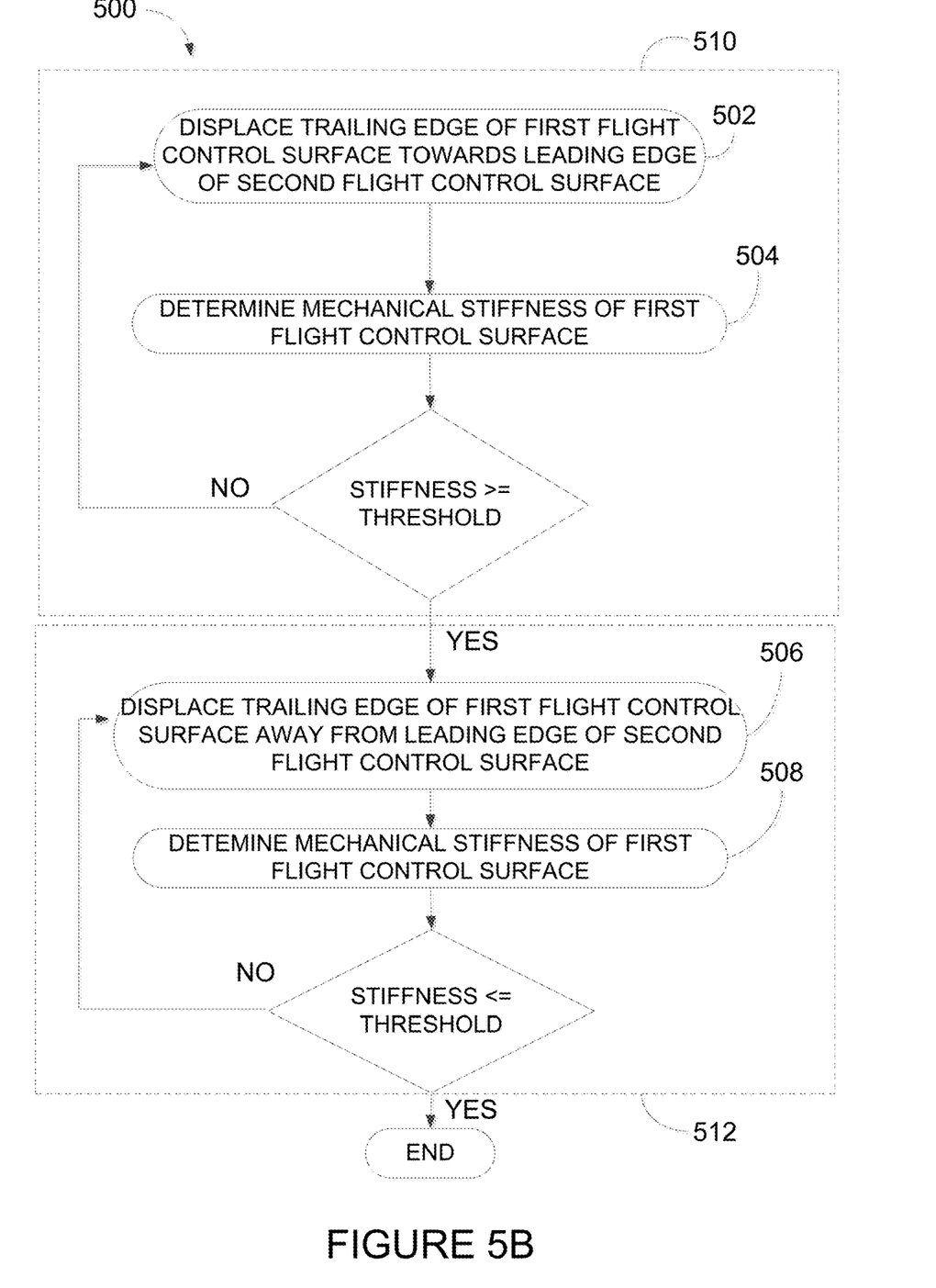
FIG. 5B is a flowchart of the method for controlling flight control surfaces, in accordance with another illustrative embodiment.

In some embodiments, the controller 12 is configured to apply a fine tuning to the force applied by the actuator 32 on the spoiler 28, to avoid having too much force applied to the spoiler 28. The spoiler 28, after having achieved a full contact with the flap 22, may be slightly released until the mechanical stiffness falls just above the threshold. At this position, full contact is still achieved but with the minimal amount of force applied to the spoiler 28. Referring to FIG. 5B, at step 506, the trailing edge 28b of the spoiler 28 is displaced away from the contact surface 22c of the flap 22 after full contact stiffness has been achieved. At step 508, the mechanical stiffness of the spoiler 28 is determined. Displacement of the spoiler 28 away from the flap 22 continues until a known intermediate mechanical stiffness, smaller than the full contact stiffness, is reached.

It will be understood that steps 502 and 504 may be performed concurrently and that steps 506 and 508 may be performed concurrently, such that the mechanical stiffness of the flight control surface is measured as the flight control surface is displaced. In alternative embodiments, the flight control surface is displaced incrementally and the mechanical stiffness is measured between each displacement. In some embodiments, the distance (or angle) by which the flight control surface is displaced at each iteration varies as a function of the difference between the measured mechanical stiffness and the threshold. For example, a large difference in mechanical stiffness may cause the flight control surface to be displaced by 3 degrees at a time, while a smaller difference in mechanical stiffness may cause the flight control surface to be displaced by 1 degree at a time. These values are illustrative only.

In some embodiments, different thresholds are used when the spoiler 28 is moved towards the flap 22 (502, 504—grouped together as block 510) and when the spoiler 28 is moved away from the flap 22 (506, 508—grouped together as block 512). For example, the threshold used at 510 may be a known full contact mechanical stiffness value and the threshold used in 512 may be a known bow stiffness value. Alternatively, a same threshold is used, whereby the threshold is crossed in a first direction in block 510 and in a second direction in block 512. In some embodiments, the threshold is found at the intersection between bow stiffness 304 and full contact stiffness 306, as shown in FIG. 3. In some embodiments, an additional delta value is added to the intersection point to account for turbulence and air gusts. In some embodiments, hysteresis is provided to prevent oscillations when transitioning between different thresholds or when crossing a threshold.

In some embodiments, blocks 510 and 512 may be repeated iteratively until a desired precision in mechanical stiffness is reached, and also optionally until persistence has been achieved.

Certain variations in operating conditions may cause the loading conditions on the aircraft to change during the flight. For example, the weight of the aircraft 10 changes as more and more fuel gets consumed. As the fuel may be stored in the wings 16a, 16b, the weight of the wings 16a, 16b changes and, consequently, the wings 16a, 16b may be subjected to further bending as the lift force on the wings 16a, 16b may remain the same. A change in speed of the aircraft 10 may also induce a change in the lift force and, consequently, may cause the wings 16a, 16b to be subjected to more or less bending. These variations may cause the contact force between the spoiler 28 and the flap 22 to become too high, which could cause structural damage or could be detrimental regarding fatigue of the spoiler 28, or too low, which could create a gap between the flap and the spoiler that adversely affects the aerodynamic performance of the aircraft. The variations in operating conditions may also cause the contact force to change due to changes in hinge moment which would displace the control surface due to its compliance (i.e. elastic deformation).

Figure 5C:
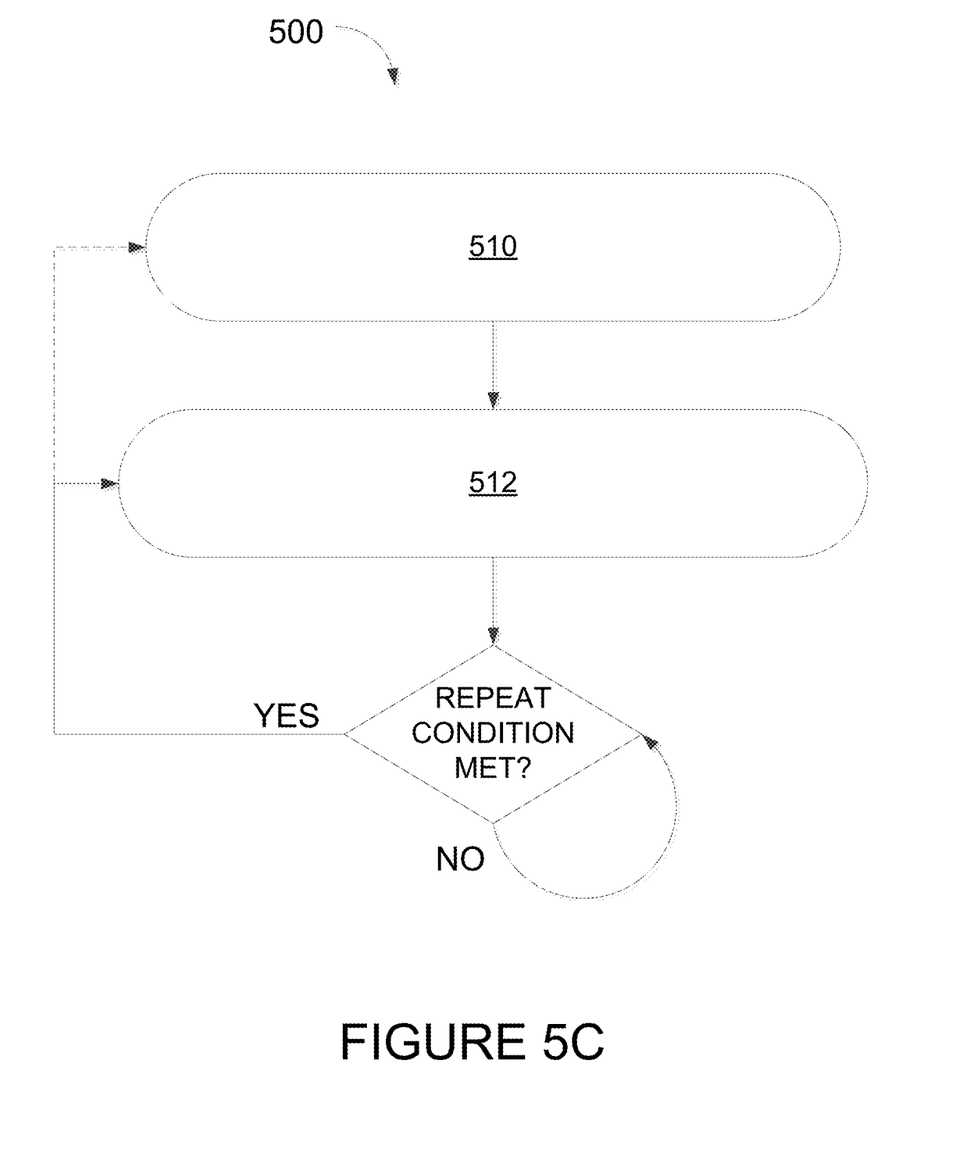
FIG. 5C is a flowchart of the method for controlling flight control surfaces, in accordance with yet another illustrative embodiment.

In some embodiments, the controller 12 is configured to cater to the variations in loading conditions. Referring to FIG. 5C, there is illustrated an example embodiment of the method 500 where blocks 512 and/or 510 are repeated when a given condition has been met. The condition may be, for instance, one or more of a change in weight of the aircraft 10 beyond a weight threshold, a percentage of total fuel burnt, a change in aircraft speed beyond a speed threshold, and a change in aircraft altitude beyond an altitude threshold. Other conditions may also be used. In some embodiments, the controller 12 or another computing device, such as an aircraft computer, is configured to trigger repeating of the contact procedure automatically when any one of the conditions has been met. In some embodiments, the contact procedure may be triggered manually by an operator, such as a pilot or a co-pilot. In some embodiments, the contact procedure is repeated periodically even if none of the loading conditions have changed, for example if a given time period has elapsed.

As per the steps found in block 512, the controller 12 may cause the trailing edge 28b of the spoiler 28 to be displaced away from the flap 22 once the full contact between the trailing edge 28b of the spoiler 28 and the contact surface 22c of the flap 22 has been achieved (step 506) until a known mechanical stiffness is reached (step 508). The control system 12 may also cause displacement of the trailing edge 28b of the spoiler 28 back toward the flap 22 (step 502) until the full contact mechanical stiffness is reached (step 504).

In some embodiments, when the condition for repeating the method 500 is met, the first flight control surface is displaced away from the second flight control surface so as to lose contact, i.e. to reach an aerodynamic stiffness, and the first flight control surface is then displaced back towards the second flight control surface to achieve full contact. Using the embodiment of FIG. 5C, block 512 would be performed with a threshold set to aerodynamic stiffness, followed by block 510 with a threshold set to full contact stiffness. Block 512 may then be repeated again with a threshold set to the intersection point between full contact stiffness and bow stiffness.

The method 500 and controller 12 for controlling the flight control surfaces of the aircraft described herein may be implemented in a high level procedural or object oriented programming or scripting language, or a combination thereof. Alternatively, the method 500 and controller 12 for controlling the flight control surfaces may be implemented in assembly or machine language. The language may be a compiled or interpreted language. Program code for implementing the method 500 and controller 12 for controlling the flight control surfaces may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the method 500 and controller 12 for controlling the flight control surfaces may also be considered to be implemented by way of a non-transitory computer-readable storage medium having a computer program stored thereon. The computer program may comprise computer-readable instructions which cause a computer, or in some embodiments the processing unit 412 of the controller 12, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling flight control surfaces of an aircraft wing having a first flight control surface and a second flight control surface, the first flight control surface having a first leading edge and a first trailing edge, the second flight control surface having a contact surface extending between a second leading edge and a second trailing edge, the first flight control surface movable to contact the first trailing edge with the contact surface and make a seal therewith, the method comprising:

displacing the first trailing edge of the first flight control surface towards the contact surface of the second flight control surface;

determining a mechanical stiffness of the first flight control surface as defined by a ratio of $\Delta F/\Delta X$ as the first flight control surface is displaced, where $\Delta F$ is a difference in force F applied to at least two different positions X1 and X2 of the first flight control surface at times T1 and T2, and $\Delta X$ is a difference in position X2−X1; and achieving full contact between the first trailing edge and the second leading edge when a known full contact mechanical stiffness is reached.

2. The method of claim 1, wherein displacing the first trailing edge of the first flight control surface comprises rotating the first flight control surface about an axis using an actuator.

3. The method of claim 2, wherein the force F applied to the first flight control surface is measured as a pressure variation across the actuator as $\Delta P * A$, and $\Delta F$ is $\Delta (\Delta P) * A$, where A is an operational area of the actuator.

4. The method of claim 2, wherein the positions X1 and X2 of the first flight control surface are measured as angular positions of the first flight control surface.

5. The method of claim 1, further comprising displacing, once full contact has been achieved, the first trailing edge of the first flight control surface away from the contact surface of the second flight control surface until a known intermediate mechanical stiffness is reached, the intermediate mechanical stiffness being smaller than the full contact mechanical stiffness.

6. The method of claim 5, wherein the intermediate mechanical stiffness corresponds to a bow stiffness plus a delta value.

7. The method of claim 5, further comprising repeating displacing of the first trailing edge of the first flight control surface away from the contact surface of the second flight control surface when a predetermined condition has been met.

8. The method of claim 7, wherein the predetermined condition corresponds to one or more of a change in weight of the aircraft beyond a weight threshold, a percentage of total fuel burnt, a change in aircraft speed beyond a speed threshold, an elapsed time, and a change in aircraft altitude beyond an altitude threshold.

9. The method of claim 1, further comprising:
displacing, once full contact has been achieved, the first trailing edge of the first flight control surface away from the contact surface of the second flight control surface until a known aerodynamic mechanical stiffness is reached, the aerodynamic mechanical stiffness being smaller than the full contact mechanical stiffness; and
repeating displacing of the first trailing edge of the first flight control surface towards the contact surface of the second flight control surface until the full contact mechanical stiffness is reached.

10. The method of claim 1, wherein the first flight control surface is a spoiler and the second flight control surface is a flap.

11. A system for controlling flight control surfaces of an aircraft wing having a first flight control surface and a second flight control surface, the first flight control surface having a first leading edge and a first trailing edge, the second flight control surface having a contact surface extending between a second leading edge and a second trailing edge, the first flight control surface movable to contact the first trailing edge with the contact surface and make a seal therewith, the system comprising:
a processor; and
a non-transitory storage medium coupled to the processor and having stored thereon program instructions executable by the processor for:
displacing the first trailing edge of the first flight control surface towards the contact surface of the second flight control surface;

determining a mechanical stiffness of the first flight control surface as defined by a ratio of $\Delta F/\Delta X$ as the first flight control surface is displaced, where $\Delta F$ is a difference in force F applied to at least two different positions X1 and X2 of the first flight control surface at times T1 and T2, and $\Delta X$ is a difference in position X2−X1; and
achieving full contact between the first trailing edge and the second leading edge when a known full contact mechanical stiffness is reached.

12. The system of claim 11, wherein displacing the first trailing edge of the first flight control surface comprises rotating the first flight control surface about an axis using an actuator.

13. The system of claim 12, wherein the force F applied to the first flight control surface is measured as a pressure variation across the actuator as $\Delta P * A$, and $\Delta F$ is $\Delta (\Delta P) * A$, where A is an operational area of the actuator.

14. The system of claim 12, wherein the positions X1 and X2 of the first flight control surface are measured as angular positions of the first flight control surface.

15. The system of claim 11, wherein the program instructions are further executable for displacing, once full contact has been achieved, the first trailing edge of the first flight control surface away from the contact surface of the second flight control surface until a known intermediate mechanical stiffness is reached, the intermediate mechanical stiffness being smaller than the full contact mechanical stiffness.

16. The system of claim 15, wherein the intermediate mechanical stiffness corresponds to a bow stiffness plus a delta value.

17. The system of claim 15, wherein the program instructions are further executable for repeating displacing of the first trailing edge of the first flight control surface away from the contact surface of the second flight control surface when a predetermined condition has been met.

18. The system of claim 17, wherein the predetermined condition corresponds to one or more of a change in weight of the aircraft beyond a weight threshold, a percentage of total fuel burnt, a change in aircraft speed beyond a speed threshold, an elapsed time, and a change in aircraft altitude beyond an altitude threshold.

19. The system of claim 11, wherein the program instructions are further executable for:
displacing, once full contact has been achieved, the first trailing edge of the first flight control surface away from the contact surface of the second flight control surface until a known aerodynamic mechanical stiffness is reached, the aerodynamic mechanical stiffness being smaller than the full contact mechanical stiffness; and
repeating displacing of the first trailing edge of the first flight control surface towards the contact surface of the second flight control surface until the full contact mechanical stiffness is reached.

20. The system of claim 11, wherein the first flight control surface is a spoiler and the second flight control surface is a flap.

21. A flight control surface assembly comprising:
a first flight control surface having a first leading edge and a first trailing edge;
a second flight control surface having a contact surface extending between a second leading edge and a second trailing edge;
an actuator coupled to the first flight control surface and configured for displacing the first trailing edge of the first flight control surface towards the contact surface of the second flight control surface; and a controller coupled to the actuator and configured for:

determining a mechanical stiffness of the first flight control surface as defined by a ratio of $\Delta F/\Delta X$ as the first flight control surface is displaced, where $\Delta F$ is a difference in force F applied to at least two different positions X1 and X2 of the first flight control surface at times T1 and T2, and $\Delta X$ is a difference in position X2−X1; and communicating to the actuator that full contact between the contact surface and the first trailing edge is achieved when a known full contact mechanical stiffness is reached.

\* \* \* \* \*